United States Patent [19]

Egli

[11] Patent Number: 4,657,392
[45] Date of Patent: * Apr. 14, 1987

[54] LOCK-IN RATE DISCRIMINATE APPARATUS FOR RING LASER ANGULAR RATE SENSORS

[75] Inventor: Werner H. Egli, Minneapolis, Minn.

[73] Assignee: Honeywell Inc., Minneapolis, Minn.

[*] Notice: The portion of the term of this patent subsequent to Mar. 12, 2002 has been disclaimed.

[21] Appl. No.: 405,452

[22] Filed: Aug. 5, 1982

[51] Int. Cl.⁴ .............................................. G01C 19/64
[52] U.S. Cl. ............................................... 356/350
[58] Field of Search ......................................... 356/350

[56] References Cited

U.S. PATENT DOCUMENTS

| | | | |
|---|---|---|---|
| 4,152,071 | 5/1979 | Podgorski | 356/350 |
| 4,248,534 | 2/1981 | Elbert | 356/350 |
| 4,415,266 | 11/1983 | Ljung | 356/350 |
| 4,473,297 | 9/1984 | Simpson et al. | 356/350 |
| 4,504,146 | 3/1985 | Morgan | 356/350 |

FOREIGN PATENT DOCUMENTS 2044984 10/1980 United Kingdom .

Primary Examiner—Vincent P. McGraw
Attorney, Agent, or Firm—Robert A. Pajak

[57] ABSTRACT

A discriminant apparatus for a ring laser angular rate sensor is described which provides a discriminant signal indicative of the lock-in rate of the sensor as a function of the phase difference and frequency difference between the counter-propagating waves therein.

36 Claims, 4 Drawing Figures

LOCK-IN RATE DISCRIMINATE APPARATUS FOR RING LASER ANGULAR RATE SENSORS

The present invention relates to angular rate sensors, and more particularly to a discriminant apparatus for providing an output signal related to the lock-in rate phenomena of ring laser angular rate sensors. Further, the present invention discloses an apparatus which makes use of a discriminant signal indicative of the lock-in rate for affecting the lock-in rate of a ring laser angular rate sensor.

Ring laser angular rate sensors are illustrated and described in U.S. Pat. Nos. 4,152,071 and 3,390,606, by Podgorski, and U.S. Pat. Nos. 3,373,650 and 3,467,472 by Killpatrick, all of which are assigned to the assignee of the present invention.

In the class of ring laser angular rate sensors, two monochromatic waves are generated to travel in opposite directions along an optical closed-loop path. The monochromatic waves are usually in the form of two laser beams. Rotation of the optical closed-loop path causes the effective path length traveled by the waves to change. Since the optical closed-loop path forms a resonant cavity providing sustained oscillations of the waves therein, the wave length of each of the waves will change, one increasing, the other decreasing as a result of rotation of the closed-loop path. Angular rotation of the closed-loop path, therefore, causes a frequency differential to occur between the two waves, which frequency differential is proportional to the rate of angular rotation.

One example of a ring laser angular rate sensor is shown and described in U.S. Pat. Nos. 3,390,606 and 4,152,071 as aforesaid. The ring laser sensor shown includes a substantially thermally and mechanically stable block which forms a triangular shaped ring laser cavity defined by three-corner mirrors. The cavity is filled by a gas which comprises, for example, helium and neon gas. In accordance with prior art practice, one of the corner mirrors is somewhat transmissive for allowing a portion of each of the counter-traveling waves or beams to be extracted from the laser cavity so as to be heterodyned in a beam combiner to produce an interference pattern. The interference pattern is detected by a photodetector which senses the beat frequency of the heterodyne optical frequencies of the two beams which is a measure of the angular rotation rate. Furthermore, the output of the photodetector is a signal related to the phase difference between the counter-propagating waves.

The phenomenon commonly associated with ring laser angular rate sensors is known as "lock-in". Lock-in is the situation where the rate of rotation of the optical closed-loop path is below a critical value known as the lock-in rate below which the two waves oscillate at only one frequency. The lock-in phenomenon is thought to be caused by coupling of energy between the waves, the dominant source being backscattering at the mirror surfaces. Other contributors to the coupling of energy include, among others, aperture affects and the gas medium itself.

In order to obviate the effects of lock-in at low rotation rates, the sensor may be biased in such a manner so that the device is kept out of lock-in for a majority of time. One biasing scheme is shown in U.S. Pat. No. 3,373,650 which provides a means for varying the frequency difference so that a frequency exists for a majority of the time. This biasing technique is commonly known as dithering. The dithering may be provided by rotationally oscillating the sensor back and forth, and may also be provided by affecting the counter-propagating waves by optically altering the waves to provide a dithering bias. Another scheme for biasing a ring laser angular rate sensor is to rotate the sensor well above the lock-in rate. This technique too, has an optical counterpart whereby the frequencies of the waves are separated sufficiently so that a frequency difference exists in the presence of low rotation rates.

The above biasing techniques do not totally eliminate the effects of lock-in since there always exists some coupling of energy between the counter-propagating waves. Particularly, in a dithered ring laser angular rate sensor, the rate of rotation of the closed-loop path goes through zero at the extremities of each oscillation, i.e. the turnaround. At these turnaround points, an accumulation of lock-in error exists in the typical gyro output. The accumulation of lock-in error is known in the art as random drift. U.S. Pat. No. 4,152,071 provided an apparatus to alter the lasing path of the counter-propagating waves so as to obtain a reduced lock-in rate for an individual sensor. By optimizng or minimizing the value of the lock-in rate, the amount of random drift or lock-in error is also minimized. (It should also be noted that the sensor scale factor is also related to sensor lock-in rate constant rate biased systems.) In U.S. Pat. No. 4,152,071, the portion of one of the waves transmitted through one of the mirrors was utilized to obtain a discriminant signal indicative of the lock-in rate. It was taught in the U.S. Pat. No. 4,152,071 that intensity variations of either wave was indicative of the lock-in rate.

SUMMARY OF THE INVENTION

In the present application, a discriminant apparatus for a ring laser angular rate sensor is described which provides a discriminant signal indicative of the lock-in rate of the sensor derived from the phase difference between the counter-propagating waves therein. The discriminant signal may be employed in a closed-loop control system for altering the coupling of energy between the counter-propagating waves in a ring laser angular rate sensor for controlling the value of the lock-in rate to a minimum rate.

In another aspect of the present application, a control means which responds to the phase difference between the waves is provided for obtaining a control signal related to lock-in rate of the sensor. The control signal can then be utilized for affecting the sensor lock-in rate.

Figure 1:
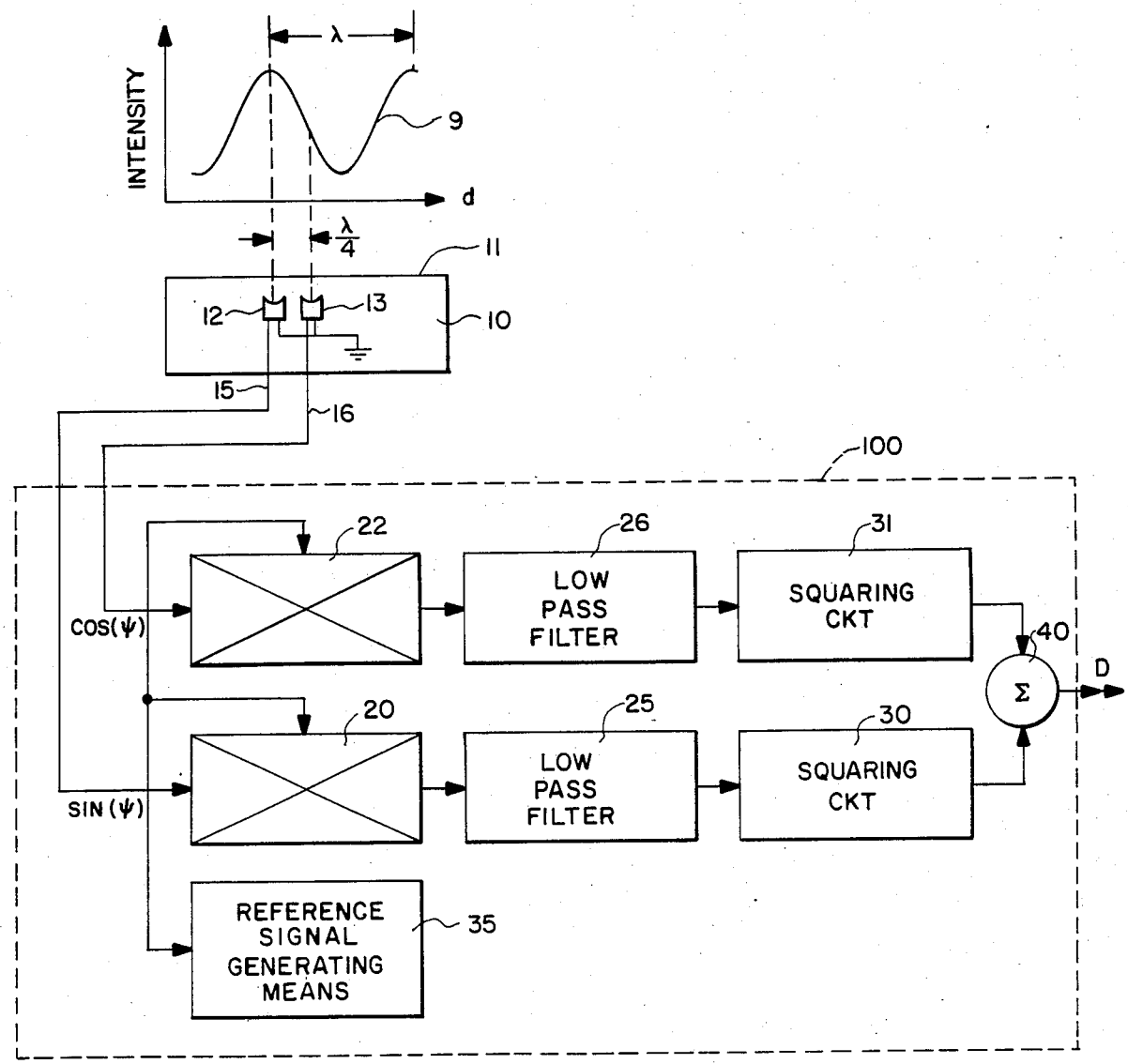
FIG. 1 is a block diagram of a lock-in rate discriminant signal generator.

APPENNDIX 1 is a showing of mathematical expressions useful for understanding the invention.

DETAILED DESCRIPTION OF THE INVENTION

The behavior of the counter-propagating waves in a laser angular rate sensor have been analyzed by many in the art of laser technology. Shown in equation (1) of APPENDIX 1 is the well known "Lock-in Equation" substantially shown and described in the text of "Laser Applications", Volume 1, 1971, the chapter entitled, "Laser Gyro", by Frederick Aronowitz, Page 150. Equation (1) of the appendix is reproduced below:

$$\dot{\psi} = \dot{\theta} + \Omega_L \sin(\psi + \alpha) \quad \text{Lock-in Equation} \quad (1)$$

where:
$\dot{\psi}$ = rate of change of the phase difference $\psi$ between the waves;
$\dot{\theta}$ = sensor input rate; and
$\Omega_L$ = lock-in rate of the sensor The lefthand side of equation (1) represents the rate of change of phase difference between the counter-propagating waves of a laser angular rate sensor. If there were no lock-in error, the rate of change in phase difference would be directly related to the rotation rate of the optical closed-loop path, this rotation rate being indicated by the first term on the righthand side of the equality of equation (1). However, because of the lock-in error, this is not the case. The righthand term of equation (1) represents the lock-in error function in the typical ring laser output where the output is derived from the change in phase difference between the waves as a measurement of rotation—related to the frequency difference of the waves.

In the usual ring laser angular rate sensor, a portion of each of the waves traveling the optical closed-loop path are optically combined so that the portion of each of the waves are heterodyned to form an interference pattern. The interference pattern contains information about the phase difference between the waves and can be utilized to determine the rate of change of the phase difference between the waves, and so is useful in obtaining an output signal related to rotation of the closed-loop path. Thus, the interference pattern is commonly utilized for providing sensor output rotational information.

In the present application, an apparatus is provided for signal processing the phase information derived from the same interference pattern useful for rotation measurement for providing a discriminant signal indicative of the sensor lock-in rate. A feedback control system employing the lock-in rate discriminant signal of the present invention can be utilized for minimizing the lock-in rate of the sensor system. In another form of the invention, a control means processes phase information derived from the interference pattern for obtaining a control signal to alter the ring laser system in such a way so as to obtain a minimum lock-in rate.

Referring now to the mathematical expressions presented in APPENDIX 1, if the lock-in error is very small, then the rate of change in phase is approximately equal to the rate of rotation of the closed-loop path. As a corollary, the change in phase angle is directly related to the change in input rotation angle. Further, assuming that the lock-in rate is much less than the input rotation rate, the lock-in error function (righthand term of equation (1)) can be expressed in terms of input rotation angle as shown in equation (2). Substituting a change in variables—equation (3), and integrating—equation (4), and again substituting a change in variables—equation (5), an expression is derived for the instantaneous phase difference $\psi$ between the counter-propagating waves as a function of the input rotation angle $\theta$, and the input rotation rate $\omega$, and the offset term $\alpha$. Equation (5) indicates that the phase difference $\psi$ is related to the input rotation angle $\theta$ offset by a lock-in error function defined by the lock-in rate $\omega_L$, the input rotation rate $\omega$, and the cosine function of the input rotation angle $\theta$. Thus, the instantaneous phase difference, normally observable from the sensor interference pattern, contains information related to the sensor lock-in rate.

In a typical laser angular rate sensor, heterodyning a portion of the counter-propagating waves produces an interference pattern which is indicative of the phase relationship between the two waves, namely the instantaneous phase difference between the waves. A phase detection means is usually utilized for deriving useful information from the interference pattern and usually includes a photodetector to measure light intensity at a spatial location relative to the interference pattern produced. The output of the photodetector may be represented by the sine or cosine function of the phase difference between the waves offset by a constant offset phase angle $\alpha$. The offset phase angle is the difference between the instantaneous phase difference between the waves and that actually detected by the photodetector because of its placement relative to the interference pattern as is well understood by those skilled in the art. Furthermore, it is well known to use two photodetectors spaced apart by one-quarter of a fringe spacing so that the respective photodetector outputs represent the sine and the cosine function of the phase difference between the counter-propagating waves. Doing so, a signal processing system can be employed to count the number of minimums and maximums to provide information of the rotation rate of the optical closed-loop path in terms of counts per second. When this output in counts per second is multiplied by the appropriate scale factor of the sensor system, a measurement of angular rotation and angular rotation rate can be obtained as is also taught in the above referred to publication.

Referring again to APPENDIX 1, the two photodetector outputs represented by the sine and cosine function of the phase difference derived in equation (5) is set forth in equations (6) and (7) respectively assuming that the input rate $\omega$ is much greater than the lock-in rate. Expanding equations (6) and (7) using common trigonometric identities, equations (6) and (7) become that as shown in equations (8) and (9).

Equations (8) and (9) show that the sine and cosine function of the phase difference between the waves will have fundamental components, sine ($\theta$) and cosine ($\theta$), at frequency $\omega$, since $\theta = \omega t$. It should be noted that $\theta$ corresponds to a multiplicity of $2\pi$ phase changes between counter-propagating waves, thus sine $\theta$ is changing very rapidly in response to rotation of the closed-loop path. Further, they will have perturbations having second harmonic components at $2\omega$, and "D.C." components or perturbation terms. The D.C. perturbation terms in equations (8) and (9) are presented again below:

$$\Omega_L/2\omega \cos \alpha,$$

$$\Omega_L/2\omega \sin \alpha$$

Multiplying the D.C. perturbation terms of equations (8) and (9) by the input rate $\omega$ and summing the squares of each of the products provides an output signal indicative of the lock-in rate $\omega_L$, and accordingly an indication of the random drift:

$$\left[\omega\left(\frac{\Omega_L}{2\omega}\cos\alpha\right)\right]^2 + \left[\omega\left(\frac{\Omega_L}{2\omega}\sin\alpha\right)\right]^2 = \frac{\Omega_L^2}{2}$$

It should be noted by the reader that either of the D.C. terms of equations (8) or (9) is satisfactory for obtaining a signal indicative of the lock-in rate since $\alpha$ is essentially constant. Nevertheless, it is desirable to square and add both terms to maximize the signal sensitivity.

Therefore, the behavior of the phase difference between the counter-propagating waves in response to rotational motion of the closed-loop path contains information for determining sensor lock-in rate which by appropriate signal processing can be utilized to provide a discriminant signal indicative of the lock-in rate of the sensor. Further, the interference pattern produced by heterodyning a portion of each of the counter-propagating waves can provide the phase information from which a lock-in discriminant signal may be obtained. The lock-in rate discriminant signal, indicative of the lock-in rate, derived from the phase information can be employed in place of the single beam signal in a control system like that shown in U.S. Pat. No. 4,152,071 for minimizing the lock-in rate.

FIG. 1, shows a phase detection means 10 for monitoring the interference pattern, well known in the art of ring laser gyros, and a lock-in rate discriminant signal generating means 100, employing the principles of the invention of the present application. Phase detection means 10 provides output phase signals in response to an interference pattern 9, presented at the surface 11 of phase detection means 10, produced by heterodyning a portion of each of the counter-propagating waves in a ring laser angular rate sensor. Photodetectors 12 and 13 are positioned such that they are separated by one-quarter of a fringe spacing so that the outputs thereof are indicative of the sine or cosine function of the phase difference between the counter-propagating waves. The photodetector output phase signals are presented to one embodiment of a lock-in rate discriminant signal generating means, designated by numeral 100, including multipliers 20 and 22, low pass filters 25 and 26, squaring circuits 30 and 31, summing circuit 40, and input rate signal generator 35. Photodetector 12 provides a first output phase signal, 15 representative of the sine of the phase difference, which is presented to a first multiplier 20. Photodetector 13 provides a second output phase signal 16 representative of the cosine function of the phase difference, which is presented to a second multiplier 22. The first and second phase signals are mathematically expressed in equations (8) and (9) respectively. Each of the multipliers 20 and 22 are presented with a second input signal from input rate signal generator 35. The input rate signal generator is intended to provide a reference signal related to the in-phase frequency difference between the counter-propagting waves of the sensor, which in some situations is directly related to the rotation rate $\omega$ of the optical closed-loop path. As will later be described, the control signals for biasing the sensor by either constant rate or by dithering may provide the intended output signal and function of input rate signal generator 35. It should be noted that optically biased sensors—a wave altering means inserted in the path of the waves—alters the frequency difference without direct rotation of the closed-loop path.

The output of each of the multipliers 20 and 22 is indicated by the mathematical expressions of equations (10) and (11) respectively shown in APPENDIX 1. Passing each of the outputs of multipliers 20 and 22 through low pass filters 25 and 26, respectively, filters out the first two terms on the righthand side of the equality of equations (10) and (11). The respective outputs of low pass filters 25 and 26 are passed through squaring circuits 30 and 31 respectively, and summed by summing means 40. The output of summing means 40 is a constant polarity output signal which is the lock-in rate discriminant signal of the present invention which is representative of the lock-in rate $\omega_L$ of the ring laser angular rate sensor.

Figure 2:
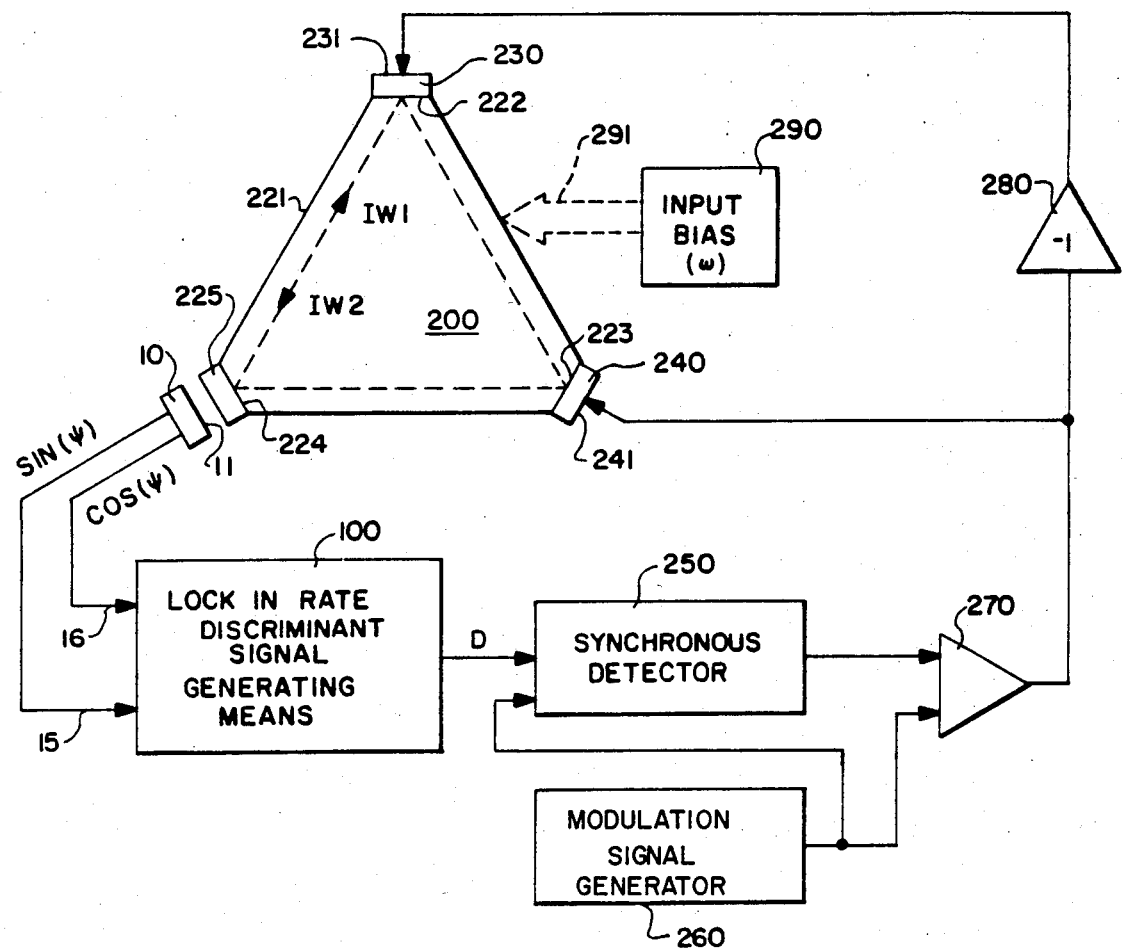
FIG. 2 is a block diagram of a ring laser angular rate sensor utilizing the discriminant signal generator of FIG. 1.

Shown in FIG. 2 is a ring laser angular rate sensor provided with an input bias. In FIG. 2, ring laser gyro 200 is illustrated using a triangular optical closed-loop path configuration. A mechanically and thermally stable block 221 provides a cavituy for containing a lasing gas and supporting mirrors 222, 223, and 224 in a well known manner. Mirror 224 is partially transmissive so that the optical system 225 can project an interference pattern on the surface 11 of phase detection means 10. Mirror 222 is shown coupled to a transducer 230 having input control 231; and mirror 223 is shown coupled to a transducer 240 having input control 241. The output of photodetectors 12 and 13 having output phase signals 15 and 16 respectively are presented to the lock-in rate discriminant signal generator 100 as shown in FIG. 1. The output of discriminant signal generator 100 is presented to a synchronous detector 250 having a second input the output of modulation signal generator 260. The output of synchronous detector 250 is presented to differential amplifier 270 having the output of synchronous detector 250 as a first input and the output of modulation signal generator 260 as a second input. The output of amplifier 270 is presented to input control 241 and is presented to input control 231 through a phase inverting amplifier 280. The embodiment shown in FIG. 2, with the exception of discriminant signal generator 100, is essentially shown and described in the referred to U.S. Pat. No. 4,152,071.

Also shown in FIG. 2 is a sensor input bias 290 coupled to sensor 200 through coupling means 291. Input bias 290 may be of the variety of biasing techniques as already indicated. For purposes of discussion, the following exposition will consider an input bias provided by oscillating the sensor 200 in a rotational mode, back and forth, with sinusoidal motion like that shown and described in U.S. Pat. No. 3,373,650. Referring to equations (8) and (9), the value of $\omega$ is the input motion of sensor 200. For the situation where the input bias is sinusoidal motion much greater than the lock-in rate for a majority of the time and greater than the inertial input motion other than bias, the value of $\omega$ may be assumed to be just bias motion. In these circumstances, the value of $\omega$ may be represented by a sinusoidal function substantially described by equation (12) of APPENDIX 1 where $f_d$ is the dither frequency of back and fourth rotation of sensor 200—namely, the optical back and forth motion of the closed-loop path. A common technique for providing rotational motion, oscillating back and forth, is a system of piezoelectric devices applied to a spring-mass system including sensor 200 in a well known manner and is particularly described in, among others, U.S. Pat. No. 3,373,650.

In a mechanically dithered sensor, i.e. oscillating rotation, the induced rate of rotation is usually much greater than the rotation rate of the closed-loop path excluding the bias. Thus the induced instantaneous rotation rate is approximately equal to the frequency difference between the waves. Accordingly, a piezoelectric device coupled to the spring-mass system can be utilized as an angular rate sensor for providing the input rate signal generator 35 output signal. In the alternative, the signal applied to the piezoelectric devices for producing the oscillating motion can also be utilized as the input rate signal generator 35 output signal. In still another alternative, the output signal and intended function of generator 35 may be provided by the usual sensor output signal indicative of rotation rate if the induced bias is not removed.

It should be noted that when an optically bias scheme is used, a similar strategy can be utilized to provide the intended output signal and function of input rate signal generator 35. Lastly, when a constant bias is used, generator 35 should provide a signal related to the bias selected.

Figure 3:
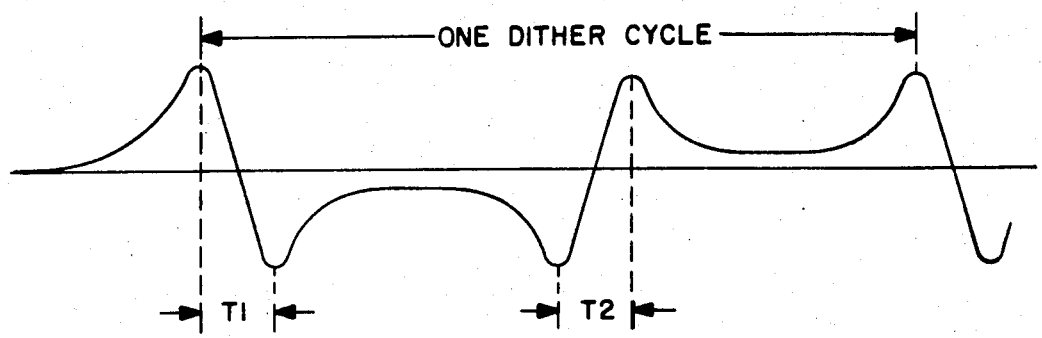
FIG. 3 is a graphical representation of the discriminant signal of the present invention.

FIG. 3 shows the response of phase detection means 10, and particularly the output of the photodetectors 12 and 13, for the situation where the input bias 290 is that substantially described by equation (12). FIG. 3 is a graphical representation of the perturbation terms of equations (8) and (9), namely the harmonic component and the D.C. term, for a mechanically dithered ring laser angular rate sensor dithered in accordance with equation (12). The perturbation terms of equations (8) and (9) are observable, as aforesaid, in the intensity of the interference pattern and included in the output phase signals of photodetectors 12 and 13. When the oscillating bias motion, in accordance with equation (12), approaches the turnaround, i.e. changes direction, the value of the denominator $\omega$ approaches zero and thus the perturbation terms ostensibly "blow up" at each turnaround instance. Actually, the approximation used in a derivation breaks down. Thus, the sum of the perturbation terms reach finite minimum and maximum values as indicated in FIG. 3 at intervals T1 and T2—occurring twice for each dither period.

In order to extract the perturbation terms, the lock-in rate discriminant signal generating means 100 obtains the product of each of the output phase signals 15 and 16 multiplied by the input rate signal $\omega$ provided by signal generator 35, thus allowing the generation of the perturbation terms of equations (10) and (11). After low pass filtering the product signals produced by the multipliers 20 and 22, signals representative of the aforesaid D.C. perturbation terms are generated.

The DC perturbation terms when subsequently squared and summed produce the lock-in rate discriminant signal which is essentially related to the square of the lock-in rate $\Omega_L$. Although the explanation of the invention has been set forth with a sinusoidal bias, a constant rate bias could also be used. It is important to understand that the output signal of input rate signal generator 35 should have the property of approximating the apparent motion of the closed-loop path, i.e. frequency difference between the waves. If a constant rate bias is used, then a constant signal could be utilized.

The control system presented in FIG. 2 with the exception of phase detection means 10 and discriminant signal generator 100 and the signals presented thereto, is essentially the control system presented in U.S. Pat. No. 4,152,071. In U.S. Pat. No. 4,152,071, the control system responds to the intensity of a single beam. More importantly, the U.S. Pat. No. 4,152,071 control system responds to the intensity variations of a single beam caused by the coupling of energy between the waves to derive a discriminant signal indicative of the lock-in rate. Having the lock-in rate discriminant signal, the control system adjusts the lasing path of the counter-propagating waves to a condition at which the lock-in rate is a minimum. The control system shown in FIG. 2 is similar to and has the same purpose of the control system of U.S. Pat. No. 4,152,071 except the control system of FIG. 2 responds to phase information of the phase difference between the waves which is derived from the interference pattern produced by the waves.

The operation of the control system shown in FIG. 2 will now be briefly described. In the control system, modulation signal generator 260 provides a modulation signal for modulating the position of mirrors 222 and 223 coupled to transducer 230 and 240 respectively. Accordingly, the lock-in rate discriminant signal D will have a component related to modulation signal of generator 260 which, in turn, is demodulated by synchronous detector 250 having the output of generator 260 as one input. This is so since the alternation of the lasing path will cause variations in the lock-in rate of the sensor and corresponding discriminant signal. The output of synchronous detector 250 is essentially a D.C. signal for driving the average position of mirrors 222 and 223 to a condition at which the discriminant signal has a value which corresponds to a minimum lock-in rate.

Figure 4:
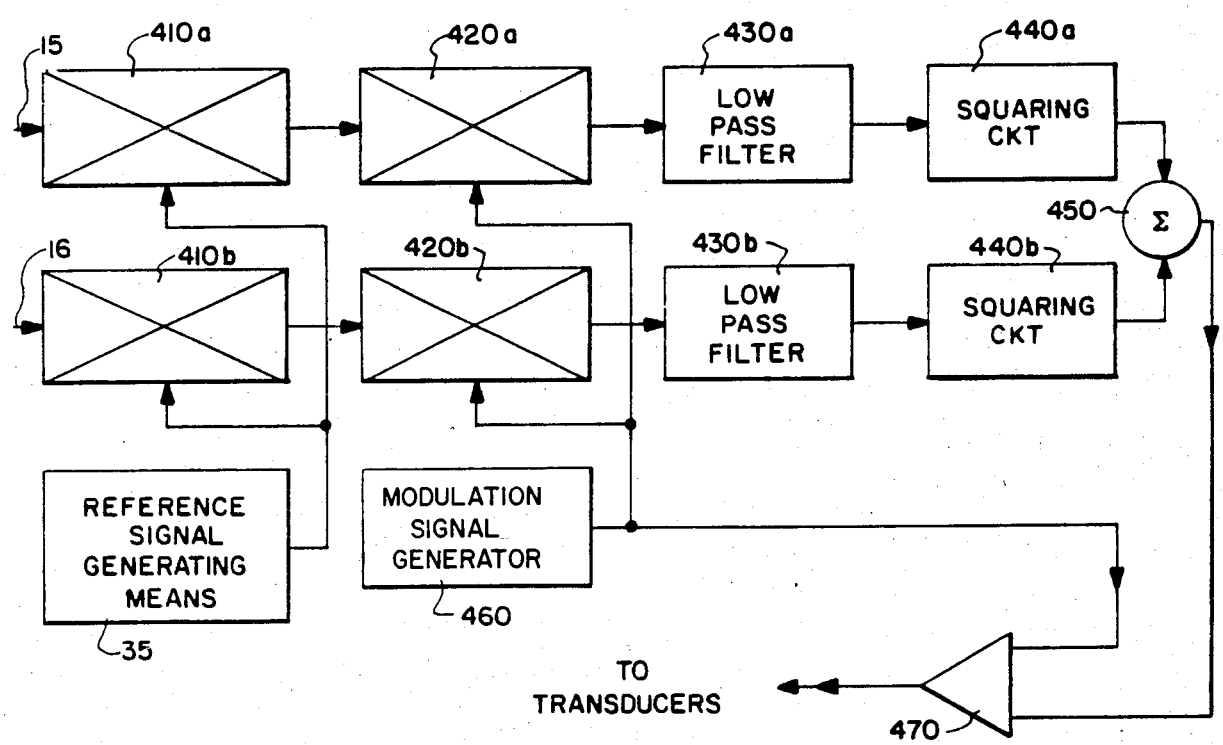
FIG. 4 is a block diagram showing an alternate arrangement of the control system shown in FIG. 2.

Shown in FIG. 4 is a control means utilizing the principles of the present invention illustrated by lock-in rate discriminant signal generating means 100 in combination with the control system just presented. The output of phase signal 15 of photodetector 12 is presented to a first multiplier 410a for multiplication by the output of input rate signal generator 35—having the same output signal and function as before. The resulting product of these two signals is presented to multiplier 420a. The output phase signal 16 of photodetector 13 is presented to a multiplier 410b for multiplication by the output of reference signal generator 35. The resulting product of these two signals is presented to multiplier 420b. Multiplier 420a multiplies the product output of multiplier 410a by the output of modulation signal generator 460, and the product output of multiplier 410b is multiplied by the output of modulation signal generator 460 in multiplier 420b. The resulting products of multipliers 420a and 420b are respectively passed through low pass filters 430a and 430b, and respectively squared by squaring circuits 440a and 440b. The outputs of the squaring circuits 440a and 440b are summed by summing circuit 450 and presented to amplifier 470. The other input of amplifier 470 is the output of modulation signal generator 460. The output of amplifier 470 is presented to transducers 240 and 230 in a similar manner as the output of amplifier 270 in FIG. 2.

The behavior of the control means of FIG. 4 is essentially that of FIG. 2 except for the arrangement of component parts thereof and intermediary signals. The resultant signals of amplifier 270 of FIG. 2 and amplifier 470 of FIG. 4 are essentially the same. Multipliers 420a and 420b serve as synchronous detectors and are responsive to the separate perturbation terms in the products extracted from the phase signals by multipliers 410a and 410b. The circuit of FIG. 4 has the possible advantage of synchronously detecting the modulation of the output phase signals of photodetectors 12 and 13 before being combined, thus lending itself toward improved resolution.

In the situation where a sinusoidal bias is used and that the output of input rate signal generator 35 has a frequency being the dither frequency, the modulation signal generator 460 may be derived from the output of signal generator 35 by multiplication or division thereof. In some situations, good performance is obtained when the output of generator 460 is a subharmonic component of the output of signal generator 35. In this circumstance, generator 460, by way of example, may be provided by a divide by "two" circuit (not shown) so that the output of generator 460 has a frequency which is "one-half" the frequency of signal generator 35 output signal. In other words, the modulation frequency of the lasing path would be at "one-half" the bias frequency provided by input bias 290 shown in FIG. 2.

The location of low pass filters in the signal paths shown in FIGS. 2 and 4 could have been alternately arranged to provide the intended function. For example, they may be placed in the signal path after squaring. These and other modifications are well known to those skilled in the art of signal processing. In the present invention and U.S. Pat. No. 4,152,071, the optical closed-loop path has been shown to be altered, in response to the lock-in rate discriminant signal, by varying the position of one or more of the mirrors defining the optical closed-loop path. Altering the position of the mirrors is a convenient method for varying the coupling of energy between the counter-propagating waves and accordingly the lock-in rate. However, other methods of altering the optical closed-loop path which include, among others, phase separating by an element in the path of the waves as well as controlling the gain of the laser, are possible. Therefore, it is to by understood in the following claims that alteration of the optical closed-loop path implies any means for altering the coupling of energy to cause a change in the sensor lock-in rate.

With respect to the present invention as illustrated in FIGS. 1-4, it has been shown that signals indicative of the lock-in rate of a ring laser angular rate sensor can be derived from information of the phase difference between counter-propagating waves. It has been further shown that a discriminant signal can be generated and subsequently employed in a closed-loop control system so as to alter the coupling of energy between the waves so as to minimize lock-in rate of the sensor and thus improve random drift and/or scale factor. It has also been shown that a control system using phase information can be constructed to minimize the sensor lock-in rate. In one implementation of the principles of the invention, information related to the phase difference between the counter-propagating waves of the sensor is obtained from an interference pattern produced by heterodyning a portion of the counter-propagating waves. It will be appreciated that although the embodiments of the invention have utilized the interference pattern produced by heterodyning the counter-propagating waves, other techniques for obtaining the required phase information may be utilized, and is within the scope and spirit of the present invention.

Further, although the embodiments of the invention have been shown in combination with a triangular optical closed-loop path and rotational input bias, other optical closed-loop paths including among others, a rectangular closed-loop path may be utilized and is within the scope of the present invention. Biasing techniques employed for altering the frequency of the counter-propagating waves may be supplied by both varying as well as constant rate biasing techniques.

The invention has been described with respect to a ring laser angular rate sensor, but other forms of electromagnetic waves may also be utilized in practice of the present invention.

The implementation of the principles of the invention have been shown in FIGS. 1 and 4 to be implemented by way of analog circuits. Nevertheless, these circuits may equally be implemented by way of digital circuits or microprocessors and the like. Thus, it will be appreciated that although specific embodiments of the invention have been shown and described herein, modifications may be made. It is intended that the following claims cover all the modifications which come within the true spirit and scope of the invention of the present application.

APPENDIX I (1) $\dot{\psi} = \dot{\theta} + \Omega_L \sin(\psi + \alpha)$ Lock-in Equation
where: $\dot{\psi}$ = rate of change of the phase difference $\psi$ between the waves;
$\dot{\theta}$ = sensor input rate; and
$\Omega_L$ = lock-in rate of the sensor (2) $\dot{\psi} = \theta + \Omega_L \sin(\theta + \alpha)$
for $\Omega_L < < \dot{\theta} = \omega = \dot{\psi}$
and $\Delta\psi \simeq \Delta\theta$ (3) $\dot{\psi} = \omega + \Omega_L \sin(\omega\tau + \alpha)$
substituting $\omega$ for $\dot{\theta}$ and $\omega\tau$ for $\theta$ (4) $\psi = \int \dot{\psi} = \omega\tau - \dfrac{\Omega_L}{\omega} \cos(\omega\tau + \alpha)$ (5) $\psi = \theta - \dfrac{\Omega_L}{\omega} \cos(\theta + \alpha)$
substituting $\theta$ for $\omega\tau$ (6) $\sin \psi = \sin \theta - \dfrac{\Omega_L}{\omega} \cos \theta \cos(\theta + \alpha)$ (7) $\cos \psi = \cos \theta + \dfrac{\Omega_L}{\omega} \sin \theta \cos(\theta + \alpha)$ for $\dfrac{\Omega_L}{\omega} << 1$ (8) $\sin \psi = \sin \theta - \dfrac{\Omega_L}{2\omega} \cos(2\theta + \alpha) - \dfrac{\Omega_L}{2\omega} \cos \alpha$ (9) $\cos \psi = \cos \theta + \dfrac{\Omega_L}{2\omega} \sin(2\theta + \alpha) - \dfrac{\Omega_L}{2\omega} \sin \alpha$

(10) $\omega \sin \psi = \omega \sin \theta - \dfrac{\Omega_L}{2} \cos(2\theta + \alpha) - \dfrac{\Omega_L}{2} \cos \alpha$

(11) $\omega \cos \psi = \omega \cos \theta + \dfrac{\Omega_L}{2} \cos(2\theta + \alpha) - \dfrac{\Omega_L}{2} \sin \alpha$

(12) $\omega = K \sin(2\pi f_d t)$

The embodiments of the invention in which an exclusive property or right is claimed are defined as follows:

1. In an angular rate sensor of the class wherein two waves are generated to travel in opposite directions along a closed-loop path, wherein the frequency of each of said waves is a function of rotation of said closed-loop path, wherein said sensor includes a biasing means for introducing a frequency bias in at least one of said waves so as to provide a frequency separation of said waves for at least a majority of the time, wherein said sensor includes means responsive to the frequency difference between said waves to provide a sensor output signals indicative of the angle of rotation of said sensor, and wherein their exists a lock-in rate of rotation below which said frequency of said waves locks in to a common frequency, an apparatus for providing a signal indicative of said lock-in rate of said sensor comprising:

phase detection means responsive to said waves for producing a first phase signal related to the instantaneous phase difference between said waves;

means for providing a reference signal related to the frequency difference between said waves; and lock-in rate discriminant signal generating means responsive to said first phase signal for providing a discriminant signal indicative of said lock-in rate of said sensor as a function of said first phase signal and said reference signal.

2. In an angular rate sensor of the class wherein two waves are generated to travel in opposite directions along a closed-loop path, wherein the frequency of each of said waves is a function of rotation of said closed-loop path, wherein said sensor includes a frequency biasing means for introducing a frequency bias in at least one of said waves so as to provide a frequency separation of said waves for at least a majority of the time, wherein said sensor includes means responsive to the frequency difference between said waves to provide a sensor output signal indicative of the angle of rotation of said sensor, and wherein their exists a lock-in rate of rotation below which said frequency of said waves locks in to a common frequency, an apparatus for minimizing said lock-in rate of said sensor comprising:

phase detection means responsive to said waves for producing a first phase signal indicative of the phase difference between said waves;

lock-in rate discriminant signal generating means responsive to said first phase signal for providing a discriminant signal indicative of said lock-in rate of said sensor; and control means responsive to said discriminant signal for altering said closed-loop path to a condition at which said lock-in rate is at a minimum.

3. The apparatus of claim 2 wherein said waves are electromagnetic waves and said closed-loop path provides an optical closed-loop path for said electromagnetic waves, and said phase detection means includes an optical system for extracting a portion of each of said waves and heterodyning said portion of each of said waves so as to produce an interference pattern, said phase detection means further including at least one photodetector responsive to said interference pattern for producing said first phase signal.

4. The apparatus of claim 3 wherein said biasing means includes means for varying the frequency of at least one of said waves so that said frequency difference changes polarity.

5. The apparatus of claim 3 wherein:

said phase detection means includes a second photodetector responsive to said interference pattern for producing a second phase signal indicative of the phase between said waves, said first and second photodetectors being spatially separated by a predetermined fraction of a fringe spacing of said interference pattern; and said lock-in rate discriminant signal generating means being adapted to respond to said first and second phase signals for providing said discriminant signal.

6. The apparatus of claim 5 wherein said first and second phase signals are representative of the sine and cosine function of said phase difference between said waves.

7. The apparatus of claim 2 wherein said lock-in rate discriminant signal generating means includes:

signal generating means capable of providing a reference signal related to the frequency difference between said waves; and signal means responsive to said first phase signal and said first reference signal for producing a substantially constant polarity output signal related to said lock-in rate of said sensor, said lock-in rate discriminant signal being related to said constant polarity output signal.

8. The apparatus of claim 5 wherein said lock-in rate discriminant generating means further includes:

signal generating means capable of providing a reference signal related to said frequency difference between said waves;

signal means responsive to first and second phase signals and said first reference signal for producing substantially constant polarity output signal related to said lock-in rate of said sensor, said discriminant signal being related to said constant polarity output signal.

9. The apparatus of claim 8 wherein said signal means further includes:

means for producing a first product signal related to the product of said first phase signal and said reference signal;

means for producing a second product signal related to the product of said second phase signal and said reference signal; and means responsive to said first and second product signals for providing a substantially constant polarity output signal related to said lock-in rate of said sensor, said discriminant signal being related to said constant polarity output signal.

10. The apparatus of claim 9 wherein said signal means includes at least one low pass filter.

11. The apparatus of claim 9 wherein said signal means further comprises:

first squaring means for providing an output signal related to the square of said first product signal;

second squaring means for providing an output signal related to the square of said second product signal; and summing means for providing an output signal indicative of the sum of said output signals of said first and second squaring means, said discriminant signal being related to said summing means output signal.

12. The apparatus of claim 9 wherein said biasing means includes means for oscillating said sensor in a rotational mode, back and forth, and wherein said reference signal is directly related to the rate of said oscillating rotation.

13. The apparatus of claim 4 wherein said biasing means includes means for oscillating said sensor in a rotational mode, back and forth.

14. The apparatus of claim 2 wherein said control means includes:

means for generating a modulation signal and a transducing means responsive to said modulation signal for varying said closed-loop path so as to produce variations in said discriminant signal, said transducing means being further responsive to said discriminant signal so as to arrive at a condition of said transducing means which corresponds to a minimum condition of said lock-in rate.

15. In an angular rate sensor of the class wherein two waves are generated to travel in opposite directions along a closed-loop path, wherein the frequency of each of said waves is a function of rotation of said closed-loop path, wherein said sensor includes a biasing means for introducing a frequency bias in at least one of said waves so as to provide a frequency separation of said waves for at least a majority of the time, wherein said sensor includes means responsive to the frequency difference between said waves to provide a sensor output signal indicative of the angle of rotation of said sensor, and wherein their exists a lock-in rate of rotation below which said frequency of said waves locks in to a common frequency, an apparatus for minimizing said lock-in rate of said sensor comprising:
phase detection means responsive to said waves for producing a first phase signal indicative of the phase difference between said waves; and
control means responsive to said first phase signal for altering said closed-loop path to a condition at which said lock-in rate is at a minimum.

16. The apparatus of claim 15 wherein said control means includes:
signal generating means capable of providing a first reference signal related to said frequency difference between said waves; and
signal means responsive to said first phase signal and said first reference signal for producing an output signal related to said lock-in rate of said sensor.

17. The apparatus of claim 15 wherein:
said biasing means includes means for varying the frequency of at least one of said waves so that said frequency difference changes polarity in accordance with a first frequency; and
said phase detection means includes an optical system for extracting a portion of each of said waves and heterodyning said portion of each of said waves so as to produce an interference pattern, said phase detection means including first and second photodetectors responsive to said interference pattern for producing first and second phase signals respectively indicative of the phase difference between said waves, said first and second photodetectors being spatially separated by a predetermined fraction of a fringe spacing of said interference pattern; and
said control means being further responsive to said second phase signal and including,
signal generating means capable of providing a reference signal related to said frequency difference between said waves;
means for producing a first product signal related to the product of said first phase signal and said first reference signal;
means for producing a second product signal related to the product of said second phase signal and said first reference signal;
means for generating a modulation signal;
signal means responsive to said first and second product signals for providing a substantially constant polarity output signal related to said lock-in rate of said sensor;
control signal means responsive to said constant polarity output signal for providing a control signal;
transducing means responsive to said modulation signal and said control signal for altering said closed-loop path so as to arrive at a condition of said transducing means which corresponds to a minimum condition of said lock-in rate.

18. The apparatus of claim 17 wherein said control signal means includes means responsive to said modulation signal for detecting a component of said first and second product signals related to said modulation signal.

19. The apparatus of claim 2, 14, 15, 16, 17, and 18 wherein said closed-loop path is an otpical closed loop.

20. The apparatus of claim 19 wherein said waves are electromagnetic waves in the form of laser beams.

21. The apparatus of claim 7 wherein said biasing means includes means for oscillating said sensor in a rotational mode, back and forth, and wherein said reference signal is directly related to the rate of said oscillating rotation.

22. The apparatus of claim 8 wherein said biasing means includes means for oscillating said sensor in a rotational mode, back and forth, and wherein said reference signal is directly related to the rate of said oscillating rotation.

23. The apparatus of claim 16 wherein said biasing means includes means for oscillating said sensor in a rotational mode, back and forth, and wherein said reference signal is directly related to the rate of said oscillating rotation.

24. In an angular rate sensor of the class wherein two waves are generated to travel in opposite directions along a closed-loop path, wherein the frequency of each of said waves is a function of rotation of said closed-loop path, wherein said sensor includes a biasing means for introducing an alternating frequency bias in at least one of said waves so as to provide a frequency separation of said waves for at least a majority of the time, wherein said sensor includes means responsive to the frequency difference between said waves to provide a sensor output signal indicative of the angle of rotation of said sensor, and wherein their exists a lock-in rate of rotation below which said frequency of said waves locks in to a common frequency, an apparatus for providing a signal indicative of said lock-in rate of said sensor comprising:
means for providing a reference signal related to the frequency difference between said waves;
phase detection means responsive to said waves for producing a first phase signal indicative of the phase difference between said waves; and
lock-in rate discriminant signal generating means having,
means for generating a first product signal as a function of the product of said first phase signal and said reference signal, and
signal means for operating on at least said first product signal and producing a discriminant output signal related to said lock-in rate of said sensor.

25. The apparatus of claim 24 wherein:
said phase detection means includes means for producing a second phase signal, out of phase with said first phase signal, indicative of said phase difference between said waves, and
said lock-in rate discriminant signal generating means includes, means for obtaining a second product signal as a function of the product of said second phase signal and said reference signal, and wherein said signal means includes means for operating on said first and second product signals to provide said discriminant signal as a function of said first and second product signals.

26. The apparatus of claim 24 wherein said waves are electromagnetic waves and said closed-loop path provides an optical closed-loop path for said electromagnetic waves, and said phase detection means includes an optical system for extracting a portion of each of said waves and heterodyning said portion of each of said waves so as to produce an interference pattern, said phase detection means further including at least one photodetector responsive to said interference pattern producing said first phase signal.

27. The apparatus of claim 26 wherein said phase detection means includes:

a second photodetector responsive to said interference pattern for producing a second phase signal indicative of the phase between said waves, said first and second photodetectors being spatially separated by a predetermined fraction of a fringe spacing of said interference fringe pattern; and said lock-in rate discriminant generating means includes, means for obtaining a second product signal as a function of the product of said second phase signal and said reference signal, and wherein said signal means includes means for operating on said first and second product signals to provide said discriminant signal as a function of said first and second product signals.

28. The apparatus of claim 27 wherein said first and second phase signals are representative of the sine and cosine function of said phase difference between said waves.

29. The apparatus of claim 26 wherein said signal means includes at least one low pass filter.

30. The apparatus of claim 25 wherein said signal means further comprises:

first squaring means for providing an output signal related to the square of said first product signal;

second squaring means for providing an output signal related to the square of said second product signal; and summing means for providing an output signal indicative of the sum of said output signals of said first and second squaring means, said discriminant signal being related to said summing means output signal.

31. The apparatus of claim 26 wherein said biasing means includes means for oscillating said sensor in a rotational mode, back and forth, and wherein said reference signal is directly related to the rate of said oscillating rotation.

32. In an angular rate sensor of the class wherein two waves are generated to travel in opposite directions along a closed-loop path, wherein the frequency of each of said waves is a function of rotation of said closed-loop path, wherein said sensor includes a biasing means for introducing a frequency bias in at least one of said waves so as to provide a frequency separation of said waves for at least a majority of the time, wherein said sensor includes means responsive to the frequency difference between said waves to provide a sensor output signal indicative of the angle of rotation of said sensor, and wherein their exists a lock-in rate of rotation below which said frequency of said waves locks in to a common frequency, an apparatus for providing a signal indicative of said lock-in rate of said sensor comprising:

means for providing a reference signal related to the frequency difference between said waves;

phase detection means responsive to said waves for producing first and second phase signals, out of phase with each other, indicative of the phase difference between said waves;

lock-in rate discriminant signal generating means having, means for generating a first product signal as a function of the product of said first phase signal and said reference signal and a second product signal as a function of the product of said second phase signal and said reference signal, and signal means responsive to said first and second product signals for producing a discriminant output signal related to said lock-in rate of said sensor; and control means responsive to said discriminant signal for altering said closed-loop path to a condition at which said lock-in rate is at a minimum.

33. The apparatus of claim 32 wherein said biasing means includes means for oscillating said sensor in a rotational mode, back and forth, and wherein said reference signal is related to the rate of said oscillating rotation.

34. The apparatus of claim 32 wherein said signal means further comprises:

first squaring means for providing an output signal related to the square of said first product signal;

second squaring means for providing an output signal related to the square of said second product signal; and summing means for providing an output signal indicative of the sum of said output signals of said first and second squaring means, said discriminant signal being related to said summing means output signal.

35. The apparatus of claim 32 wherein said control means includes:

means for generating a modulation signal; and transducing means responsive to said modulation signal for varying said closed-loop path so as to produce variations in said discriminant signal, said transducing means being further responsive to said discriminant signal so as to arrive at a condition of said transducing means which corresponds to a minimum condition of said lock-in rate.

36. The sensor of claim 1 further comprising:

control means responsive to said discriminant signal for altering said closed-loop path to a condition at which said lock-in rate is at a minimum.

* * * * *